United States Patent
Kang et al.

(10) Patent No.: US 9,490,868 B2
(45) Date of Patent: Nov. 8, 2016

(54) APPARATUS AND METHOD FOR TRANSMITTING DATA USING HUMAN BODY

(71) Applicant: ELECTRONICS AND TELECOMMUNICATIONS RESEARCH INSTITUTE, Daejeon (KR)

(72) Inventors: Tae-Wook Kang, Daejeon (KR); In-Gi Lim, Daejeon (KR); Sung-Weon Kang, Daejeon (KR); Kyung-Hwan Park, Daejeon (KR); Chang-Hee Hyoung, Daejeon (KR); Sung-Eun Kim, Daejeon (KR); Jung-Bum Kim, Daejeon (KR); Hyung-Il Park, Daejeon (KR); Byoung-Gun Choi, Daejeon (KR); Jung-Hwan Hwang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 20 days.

(21) Appl. No.: 14/703,081

(22) Filed: May 4, 2015

(65) Prior Publication Data

US 2015/0333842 A1 Nov. 19, 2015

(30) Foreign Application Priority Data

May 15, 2014 (KR) .................. 10-2014-0058257

(51) Int. Cl.
| | |
|---|---|
| *H04B 1/00* | (2006.01) |
| *H04B 1/713* | (2011.01) |
| *H04B 13/00* | (2006.01) |
| *H04L 1/06* | (2006.01) |
| *H04J 13/18* | (2011.01) |

(52) U.S. Cl.
CPC ............ *H04B 1/713* (2013.01); *H04B 13/005* (2013.01); *H04J 13/18* (2013.01); *H04L 1/06* (2013.01); *H04L 1/0625* (2013.01)

(58) Field of Classification Search
CPC ...... H04B 13/005; H04B 1/707; H04B 7/12; A61B 5/0028; A61B 5/0024
USPC ................................... 375/135, 146
See application file for complete search history.

(56) References Cited

U.S. PATENT DOCUMENTS

2011/0064161 A1    3/2011   Lim et al.
2013/0044789 A1*   2/2013   Choi ................. H04B 1/707
                                                375/146

FOREIGN PATENT DOCUMENTS

| KR | 10-2008-0114451 A | 12/2008 |
| KR | 10-2011-0029059 A | 3/2011 |
| KR | 10-2012-0045964 A | 5/2012 |
| WO | 2009/002009 A1 | 12/2008 |

OTHER PUBLICATIONS

IEEE, "Part 15.6: Wireless Body Area Networks" Feb. 29, 2012, IEEE Computer Society, IEEE Std 802.15.6-2012, pp. 244-245.*

* cited by examiner

*Primary Examiner* — David S Huang
(74) *Attorney, Agent, or Firm* — LRK Patent Law Firm

(57) ABSTRACT

An apparatus and method for transmitting data using a human body. The apparatus includes a parallel bit stream generation unit, a frequency selective spreading unit, a matched filter unit, and a transmission filter unit. The parallel bit stream generation unit outputs a parallel bit stream for an input serial bit stream. The frequency selective spreading unit divides the parallel bit stream into a preset number of bit groups, generates a single code vector by combining orthogonal code vectors corresponding to the respective bit groups, and shifts the center frequency of a transmission signal by spreading the single code vector using a frequency shift code. The transmission filter unit meets a transmit mask for the transmission signal.

13 Claims, 6 Drawing Sheets

| BIT-GROUP | $b_2b_1b_0$ | ORTHOGONAL CODE | CODE-GROUP |
|---|---|---|---|
| BIT-GROUP1 | 000 | 1111111111111111 | CODE-GROUP1 |
| | 001 | 1010101010101010 | |
| | 010 | 1100110011001100 | |
| | 011 | 1001100110011001 | |
| | 100 | 1111000011110000 | |
| | 101 | 1010010110100101 | |
| | 110 | 1100001111000011 | |
| | 111 | 1001011010010110 | |
| BIT-GROUP | $b_4b_3$ | ORTHOGONAL CODE | CODE-GROUP |
| BIT-GROUP2 | 00 | 1111111100000000 | CODE-GROUP2 |
| | 01 | 1010101001010101 | |
| | 10 | 1100110000110011 | |
| | 11 | 1001100101100110 | |
| BIT-GROUP | $b_6b_5$ | ORTHOGONAL CODE | CODE-GROUP |
| BIT-GROUP3 | 00 | 1111000000001111 | CODE-GROUP3 |
| | 01 | 1010010101011010 | |
| | 10 | 1100001100111100 | |
| | 11 | 1001011001101001 | |

FIG. 4

| INFORMATION BIT TRANSMISSION RATE[kbps] | SYMBOL TRANSMISSION RATE [Ksps] | ORTHOGONAL CODE CHIP TRANSMISSION RATE[Mcps] | NUMBER OF BITS OF FREQUENCY SHIFT CODE [Chips] | NUMBER OF BITS OF TRANSMISSION CODE PER SYMBOL[Chips] |
|---|---|---|---|---|
| 287 | 41 | 0.656 | 64 | 1024 |
| 574 | 82 | 1.313 | 32 | 512 |
| 1148 | 164 | 2.625 | 16 | 256 |
| 2296 | 328 | 5.25 | 8 | 128 |

APPARATUS AND METHOD FOR TRANSMITTING DATA USING HUMAN BODY

CROSS-REFERENCE TO RELATED APPLICATION

This application claims the benefit of Korean Patent Application No. 10-2014-0058257, filed May 15, 2014, which is hereby incorporated by reference herein in its entirety.

BACKGROUND

1. Technical Field

Embodiments of the present invention relate generally to an apparatus and method for transmitting data using a human body and, more particularly, to an apparatus and method that are capable of transmitting data at a maximum of 2.2969 Mbps while meeting a transmit mask corresponding to requirements for the transmission signal frequency characteristics of the physical layer of human body communication in a network using a human body as a medium.

2. Description of the Related Art

Human body communication technology is technology that transfers signals between devices connected to a human body using the conductive human body as a communication channel.

As described above, human body communication enables communication between various portable devices, such as a personal digital assistant (PDA), a portable personal computer, a digital camera, a smart phone, etc., and communication with a fixed device, such as a printer, a TV, an entry and exit control system, or the like, through the establishment of a network by a user's simple touch, as in Korean Patent Application Publication No 2012-0045964 entitled "Real-Time Data Transmission System and Method using Human Body Communication."

The physical layer structure and requirements of human body communication are set out in the IEEE standard 802.15.6 (wireless body area networks (WBAN)) standard. A human body communication transmitter that transmits data at a maximum of 1.3125 Mbps using frequency selective digital transmission (FSDT) in the WBAN standard can increase maximum transmission rate using a method of increasing the number of symbols of 16 orthogonal code vectors presented by the WBAN standard as transmission symbols, or the like.

However, this method is problematic in that a transmit mask corresponding to requirements for the frequency characteristics of a transmission signal presented by the WBAN standard is not met because the frequency characteristics, i.e., the working frequency band, of a transmission signal is increased.

Alternatively, although a method of increasing the length of a frequency shift code may be considered in order to improve detection performance, i.e., bit error rate (BER), with respect to a reception signal, this method is also problematic in that transmission rate is reduced when the length of the frequency shift code is increased.

SUMMARY

At least some embodiments of the present invention are directed to the provision of an apparatus and method that are capable of transmitting data at a rate of a maximum of 2.2969 Mbps and at a minimum reception signal detection error rate while meeting a transmit mask corresponding to requirements for the transmission signal frequency characteristics of the physical layer of human body communication in a network using a human body as a medium.

In accordance with an aspect of the present invention, there is provided a method of transmitting data using a human body, including: outputting a parallel bit stream for an input serial bit stream; dividing the parallel bit stream into a preset number of bit groups, and mapping the bit groups to code groups corresponding to respective orthogonal code vectors; combining orthogonal code vectors corresponding to outputs of the respective code groups into a single code vector, and outputting the single code vector; shifting the center frequency of a transmission signal by spreading the single code vector using a frequency shift code; and applying a transmission code, corresponding to a result obtained by shifting the center frequency of the transmission signal, to a human body through a matched filter and a transmission filter.

The code groups may correspond to results obtained by dividing 16 orthogonal codes into three groups.

The matched filter may include a raised cosine filter.

The sample rate of the matched filter upon applying the transmission code to the human body may be n times the sampling speed of the frequency shift code.

Applying the transmission code to the human body may include, when n is "1" in connection with the sample rate of the matched filter, applying the transmission code, corresponding to the result obtained by shifting the center frequency of the transmission signal, to the human body through only the transmission filter.

Applying the transmission code to the human body may include applying the transmission code to the human body through only the transmission filter having, a structure in which an analog low pass filter and a high pass filter, or an analog high pass filter and a low pass filter have been successively arranged.

In accordance with another aspect of the present invention, there is provided an apparatus for transmitting data using a human body, including: a parallel bit stream generation unit configured to output a parallel bit stream for an input serial bit stream; a frequency selective spreading unit configured to divide the parallel bit stream into a preset number of bit groups, to generate a single code vector by combining orthogonal code vectors corresponding to the respective bit groups, and to shift the center frequency of a transmission signal by spreading the single code vector using a frequency shift code; a matched filter unit; and a transmission filter unit configured to meet a transmit mask for the transmission signal.

The frequency selective spreading unit may map the bit groups to respective code groups corresponding to the respective orthogonal code vectors, and may combine three orthogonal code vectors corresponding to outputs of the respective code groups.

The code groups may correspond to results obtained by dividing 16 orthogonal codes into three groups.

The matched filter may include a raised cosine filter.

The sample rate of the matched filter may be n times the sampling speed of the frequency shift code.

When n is "1" in connection with the sample rate of the matched filter, a transmission code, corresponding to a result obtained by shifting the center frequency of the transmission signal, may be applied to the human body through only the transmission filter unit.

A transmission code, corresponding to a result obtained by shifting the center frequency of the transmission signal, may be applied to the human body through only the transmission filter having a structure in which an analog low pass filter and a high pass filter, or an analog high pass filter and a low pass filter have been successively arranged.

BRIEF DESCRIPTION OF THE DRAWINGS

The above and other objects, features and advantages of the present invention will be more clearly understood from the following detailed description taken in conjunction with the accompanying drawings, in which:

FIG. 4 is a reference diagram illustrating a method of performing mapping according to an embodiment of the present invention;

DETAILED DESCRIPTION

Figure 1:
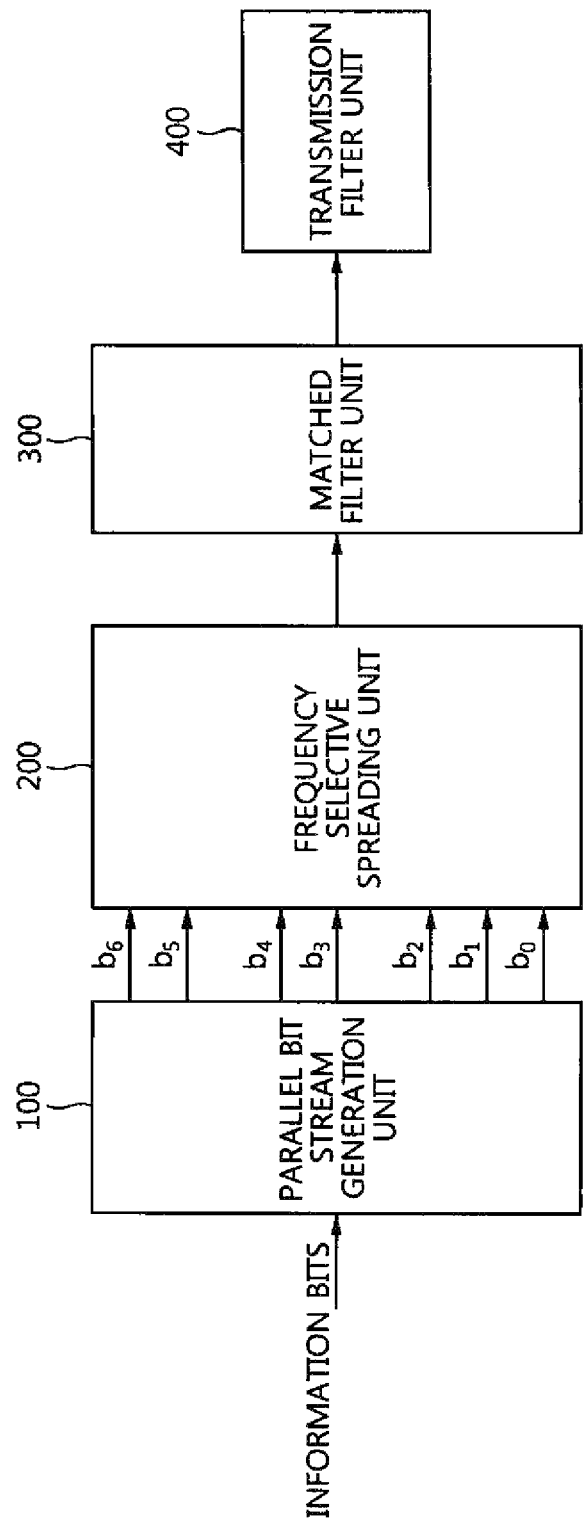
FIG. 1 is a configuration diagram schematically illustrating an apparatus for transmitting data using a human body according to an embodiment of the present invention.

Embodiments of the present invention will be described in detail below with reference to the accompanying drawings. Redundant descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

An apparatus and method that are capable of transmitting data at a maximum of 2.2969 Mbps while meeting a transmit mask corresponding to requirements for the transmission signal frequency characteristics of the physical layer of human body communication in a network using a human body as a medium according to embodiments of the present invention are described in detail with reference to the accompanying drawings.

FIG. 1 is a configuration diagram schematically illustrating an apparatus for transmitting data using a human body according to an embodiment of the present invention.

Referring to FIG. 1, the apparatus for transmitting data using a human body includes a parallel bit stream generation unit 100, a frequency selective spreading unit 200, a matched filter unit 300, and a transmission filter unit 400.

The parallel bit stream generation unit 100 outputs a 7-bit parallel bit stream $b_0$ to $b_6$ for input transmission data, i.e., a serial bit stream. The parallel bit stream generation unit 100 corresponds to a 1:7 serial to parallel converter (hereinafter also referred to as a "S2P").

The frequency selective spreading unit 200 generates a transmission code for the 7-bit parallel bit stream $b_0$ to $b_6$.

Although the matched filter unit 300 may be formed of a raised cosine filter, it is not limited thereto.

The characteristics of the matched filter unit 300 generally follow the characteristics of a well-known raised cosine filter. The sample rate of the matched filter unit 300 is n times the sampling speed of the frequency shift code in the selective spreading unit 200. In this case, n is a positive integer.

For example, when n is 1, the matched filter unit 300 a filter in which the number of taps is 1 and its gain is 1. The output signal of a frequency shifter within the frequency selective spreading unit 200 becomes the output signal of the matched filter unit 300 without change.

The transmission filter unit 400 has a structure in which an analog low pass filter and a high pass filter, or an analog high pass filter and a low pass filter have been successively arranged.

The transmission filter unit 400 corresponds to a transmission filter that meets a frequency spectrum transmit mask for a transmission code required for human body communication using an FSDT transmission method by IEEE standard 802.15.6 (a standard for wireless body area networks). The output signal of the transmission filter is applied to a human body, and is then transmitted using the human body as a medium.

Next, the configuration of a frequency selective spreading unit 200 according to an embodiment of the present invention is described in detail with reference to FIG. 2.

Figure 2:
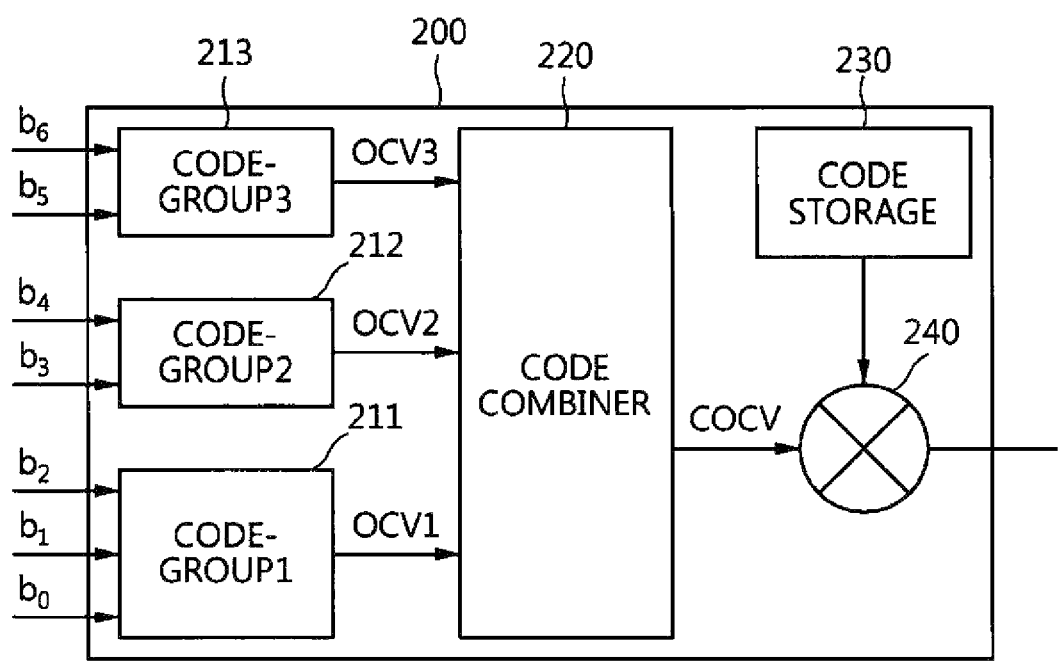
FIG. 2 is a configuration diagram illustrating a frequency selective spreading unit according to an embodiment of the present invention.

FIG. 2 is a configuration diagram illustrating the frequency selective spreading unit 200 according to the present embodiment.

First, the frequency selective spreading unit 200 receives a 7-bit parallel bit stream $b_0$ to $b_6$ from the parallel bit stream generation unit 100.

Referring to FIG. 2, the frequency selective spreading unit 200 includes a mapper, a code combiner 220, code storage 230, and a frequency shifter 240.

The mapper divides the 7-bit parallel bit stream $b_0$ to $b_6$ into bit-group 1 of three bits ($b_0$, $b_1$, $b_2$), bit-group 2 of two bits ($b_3$, $b_4$, and bit-group 3 of two bits ($b_5$, $b_6$), which do not have the same number of bits, and maps the resulting bit groups to code-group 1 211, code-group 2 212, and code-group 3 213, respectively, which correspond to respective orthogonal code vectors. In this case, code-group 1 211, code-group 2 212, and code-group 3 213 correspond to results obtained by dividing 16 orthogonal codes into three groups.

The mapper transfers the outputs of the respective code groups corresponding to the results of the mapping, i.e., orthogonal code vectors OCV1, OCV2 and OCV3, to the code combiner 220.

The code combiner 220 combines three orthogonal code vectors OCV1, OCV2 and OCV3 corresponding to the outputs of the respective code groups into a single combined orthogonal code vector COCV, and outputs the single combined orthogonal code vector COCV.

More specifically, the code combiner 220 combines the three orthogonal code vectors OCV1, OCV2 and OCV3 into a single combined orthogonal code vector COCV using a logic operation (for example, the carry output configuration of a binary full adder), such as Equation 1:

$$\text{COCV}=(\text{OCV1 and OCV2}) \text{ or } (\text{OCV1 and OCV3}) \text{ or } (\text{OCV2 and OCV3}) \qquad (1)$$

The code storage 230 includes frequency shift code including a clock signal stream that toggles between 1 and 0 at a frequency of 42 MHz (for example, 101010 . . . ).

The frequency shifter 240 spreads the output signal of the code combiner 220 using the frequency shift code stored in the code storage 230, thereby shifting the center frequency of the transmission signal to a frequency of 21 MHz corresponding to half of the clock frequency $f_{op}$ (42 MHz) of the frequency shift code.

For example, in the frequency shifter 240, when part of a COCV is [1 0 0 1 . . . ] and a frequency shift code is [1 0 1 0 1 0 1 0], each bit of the COCV is multiplied by the frequency shift code, and thus spread transmission code [1 0 1 0 1 0 1 0 0 1 0 1 0 1 0 1 0 1 0 1 0 1 1 0 1 0 1 0 1 0 . . . ] is output.

Accordingly, the number of bits of the output of the signal frequency shifter 240, i.e., a transmission signal, is a value obtained by multiplying the number of bits of the COCV by the number of bits of the frequency shift code.

Next, a method of transmitting data using a human body according to an embodiment of the present invention is described in detail with reference to FIG. 3.

Figure 3:
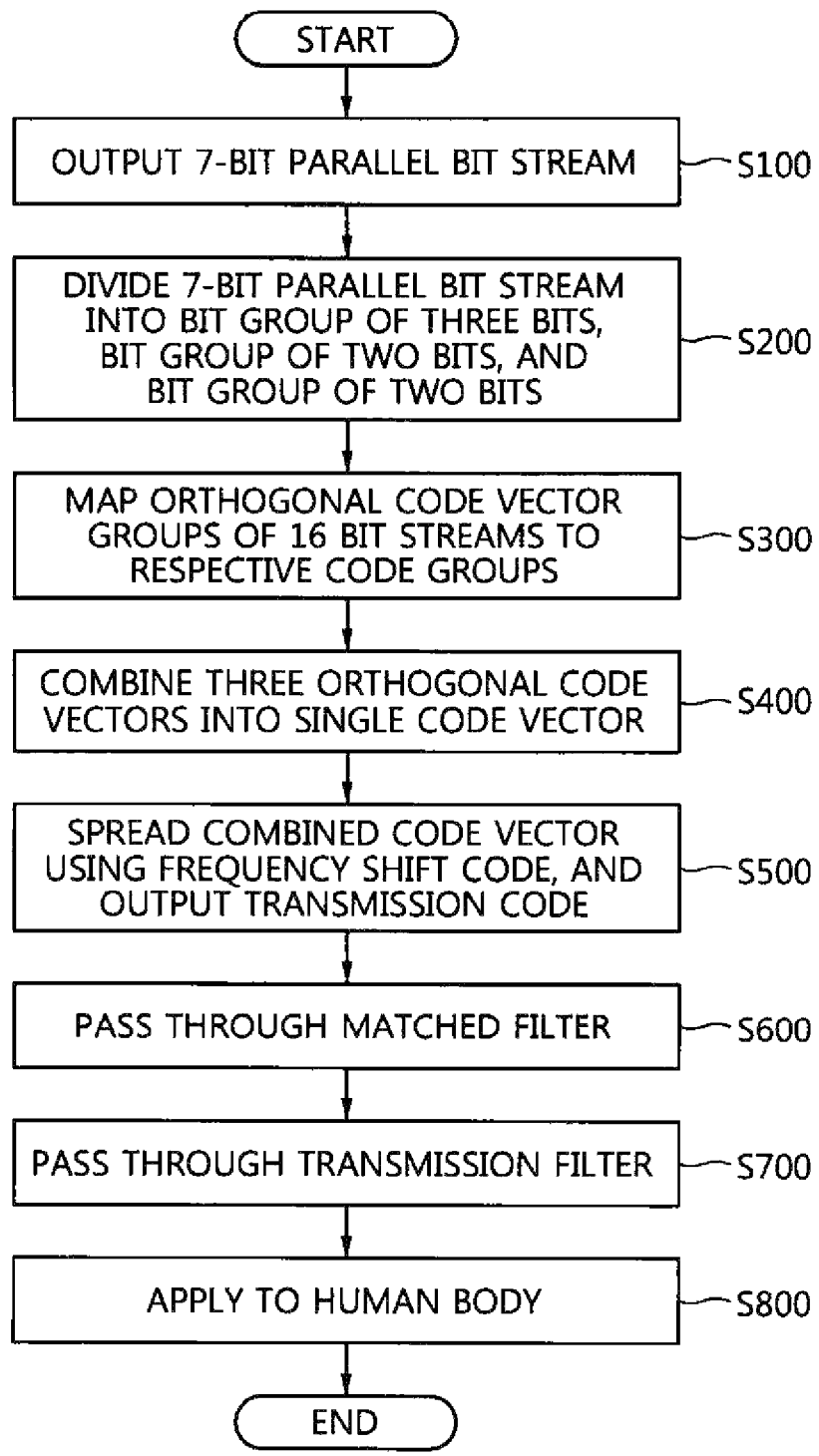
FIG. 3 is a flowchart illustrating a method of transmitting data using a human body according to an embodiment of the present invention.

FIG. 3 is a flowchart illustrating the method of transmitting data using a human body according to the present embodiment.

First, an apparatus for performing a method of transmitting data using a human body includes the parallel bit stream generation unit 100, the frequency selective spreading unit 200, the matched filter unit 300, and the transmission filter unit 400, as illustrated in FIG. 1.

Referring to FIG. 3, the parallel bit stream generation unit 100 outputs a 7-bit parallel bit stream $b_0$ to $b_6$ for transmission data, i.e., a serial bit stream, to the frequency selective spreading unit 200 at step S100.

The frequency selective spreading unit 200 divides the 7-bit parallel bit stream $b_0$ to $b_6$ into bit-group 1 of three bits ($b_0$, $b_1$, $b_2$), bit-group 2 of two bits ($b_3$, $b_4$), and bit-group 3 of two bits ($b_5$, $b_6$), which do not have the same number of bits at step S200.

The frequency selective spreading unit 200 maps the resulting bit groups, obtained at step S200, to code-group 1 211, code-group 2 212, and code-group 3 213, respectively, which correspond to respective orthogonal code vectors at step S300. In this case, code-group 1 211, code-group 2 212, and code-group 3 213 correspond to results obtained by dividing 16 orthogonal codes into three groups.

The frequency selective spreading unit 200 combines the outputs of the respective code groups corresponding to the results of the mapping performed at step S300, i.e., three orthogonal code vectors OCV1, OCV2 and OCV3, into a single combined orthogonal code vector COCV at step S400.

The frequency selective spreading unit 200 spreads the combined orthogonal code vector COCV, corresponding to the result of the combination performed at step S400, using a frequency shift code and then outputs a transmission code at step S500.

The matched filter unit 300 performs matched filtering on the transmission code at step S600.

The transmission filter unit 400 performs analog transmission filtering on the filtering result of the matched filter unit 300 in order to meet a transmit mask for the transmission signal at step S700, and applies an output signal to a human body and transmits the output signal using a human body as a medium at step S800. For this purpose, the transmission filter unit 400 has a structure in which an analog low pass filter and a high pass filter, or an analog high pass filter and a low pass filter have been successively arranged.

Next, a method of mapping bit groups to the orthogonal code vectors of respective code groups, as at step S300, is described in detail with reference to FIG. 4.

FIG. 4 is a reference diagram illustrating a method of performing mapping according to an embodiment of the present invention.

The mapper of the frequency selective spreading unit 200 divides a 7-bit parallel bit stream $b_0$ to $b_6$ into bit-group 1 of three bits ($b_0$, $b_1$, $b_2$), bit-group 2 of two bits ($b_3$, $b_4$), and bit-group 3 of two bits ($b_5$, $b_6$), which do not have the same number of bits, and maps the resulting bit groups to code-group 1 211, code-group 2 212, and code-group 3 213, respectively, which correspond to respective orthogonal code vectors. In this case, code-group 1 211, code-group 2 212, and code-group 3 213 correspond to results obtained by dividing 16 orthogonal codes into three groups.

Referring to FIG. 4, each of the code groups may be stored and used in memory (not illustrated) in the form of a lookup table.

As illustrated in a look-up table, such as that of FIG. 4, each of the bit groups is mapped to the orthogonal code vector of a corresponding code group based on the value of corresponding bits.

Figures 5, 6:
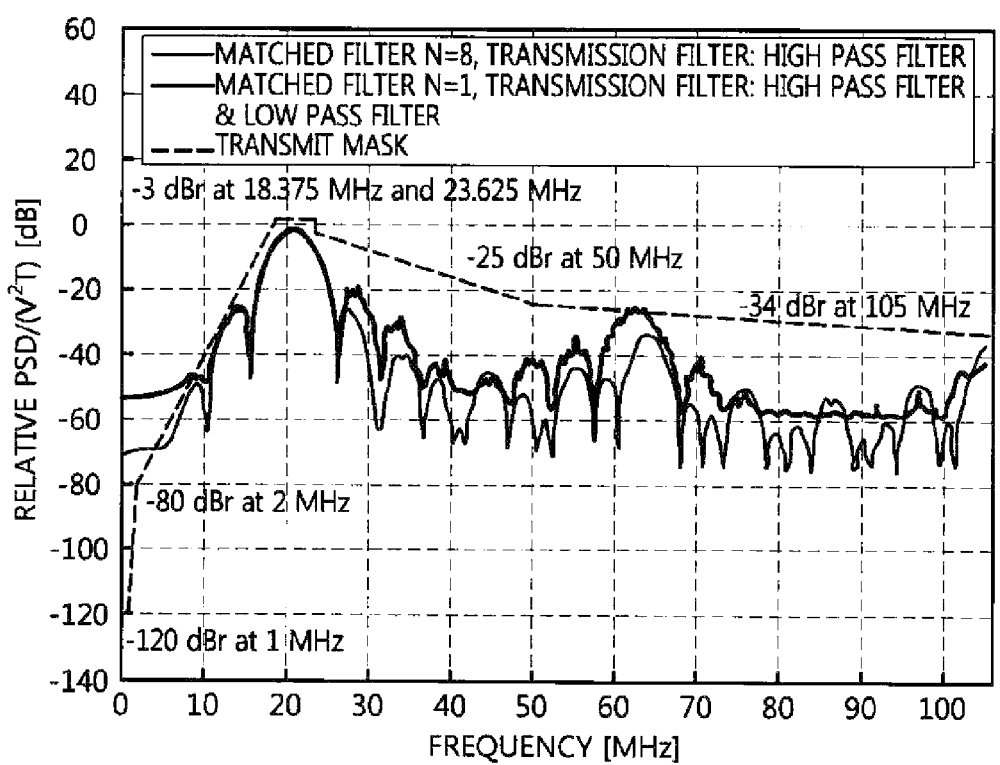
FIG. 5 is a reference diagram that is used in, a method of transmitting data using a human body according to an embodiment of the present invention.
FIG. 6 is a diagram illustrating a transmit mask required by the standard for a transmission code and a frequency spectrum passed through a filter unit according to an embodiment of the present invention.

FIG. 5 presents symbol transmission rate corresponding to the output speed of the parallel bit stream generation unit 100 based on each information bit transmission rate, orthogonal code vector (OCV1, OCV2, OCV3) chip transmission rate based on the information bit transmission rate, the number of bits of a frequency shift code based on the information bit transmission rate, and the number of bits of a transmission code based on the information bit transmission rate, when in an apparatus for transmitting data using a human body according to an embodiment of the present invention, the center frequency of the transmission signal is 42 MHz, the clock frequency $f_{op}$ of the frequency shift code, minimum information bit transmission rate in which one or more digits to the right of 1 kbps have been discarded is 287 kbps, and maximum information bit transmission rate meeting a transmit mask required by the standard for the frequency spectrum of the transmission code passed through the transmission filter is 2296 Kbps.

FIG. 6 presents a transmit mask required by the standard for a transmission code and a frequency spectrum transmission passed through a filter unit according to an embodiment of the present invention.

In the y axis of FIG. 6, T is the sampling period of the signal, and V is the amplitude of the transmission signal.

Referring to FIG. 6, it can be seen that the transmission code passed through the transmission filter unit 400 meets the transmit mask. In this case, the transmission filter unit 400 uses a filter implemented using a structure in which an analog high pass filter and a low pass filter have been successively arranged, rather than a band pass filter, thereby reducing the order of the filter and thus attenuating the distortion of the signal.

Furthermore, according to the present invention, harmonic and sidelobe components can be attenuated by the matched filter unit 300, and thus a low pass filter part may be excluded from the transmission filter unit 400 or a low order filter may be used.

When n=8 in the matched filter unit 300, a low pass filter part has been excluded from the transmission filter unit 400, and thus an effect in which the distortion of the transmission signal is reduced and thus performance is improved can be achieved.

Figure 7:
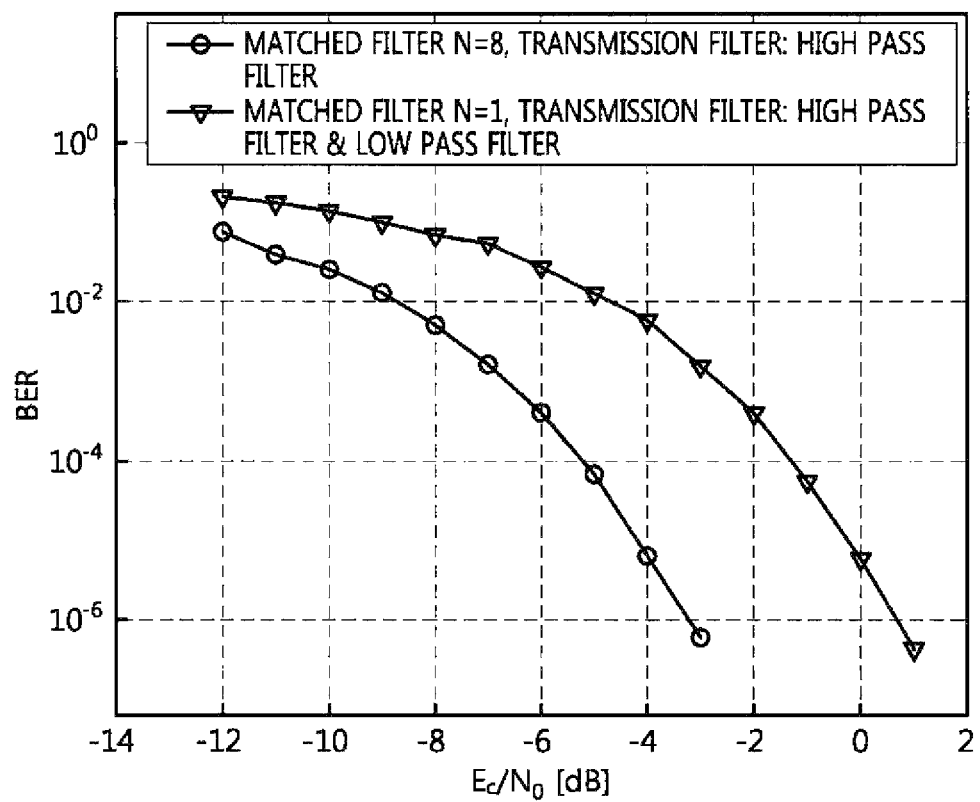
FIG. 7 is a diagram illustrating simulation results according to an embodiment of the present invention.

FIG. 7 is a diagram illustrating simulation results according to an embodiment of the present invention.

FIG. 7 illustrates the performance simulation results of bit error rate (BER) versus $E_c/N_0$ (received energy per chip over noise power spectral density) in a white noise channel according to an embodiment of the present invention.

A reception signal is detected by performing hard decision on a signal passed through a matched filter being the same as that used in an apparatus for transmitting data signal with respect to a signal passed through an analog front end including a filter and an amplifier for amplification and signal stabilization, and it is assumed that time and frequency for the reception signal have been completely synchronized at a receiver. In this case, information bit detection for a reception signal may be performed by calculating $\hat{c}_1$, $\hat{c}_2$, $\hat{c}_3$ using Equation 2 below:

$$\hat{c}_1 = \underset{c \in S_1}{\operatorname{argmin}} d(c, y) \quad (2)$$
$$\hat{c}_2 = \underset{c \in S_2}{\operatorname{argmin}} d(c, y)$$
$$\hat{c}_3 = \underset{c \in S_3}{\operatorname{argmin}} d(c, y)$$

Referring to Equation 2, $s_1$, $s_2$, $s_3$ are sets of code vector signals passed through the frequency shifter 240 with respect to all possible orthogonal code vectors OCV1, OCV2 and OCV3 that can be generated in the respective code groups 211 to 213. Furthermore, y is the hard decision signal of the reception signal code vectors, and d( ) is a Hamming distance value between two code vectors.

Accordingly, candidate vectors passed through the frequency shifter 240, corresponding to the code vectors $\hat{c}_1$, $\hat{c}_2$, $\hat{c}_3$, are detected based on Equation 2, respective corresponding orthogonal code vectors OCV1, OCV2 and OCV3 are obtained, the information bits of each bit group are detected using the relationship between a corresponding code group and the corresponding bit group, and parallel to serial conversion is performed, thereby detecting the information bits.

When BER versus $E_c/N_0$ performance simulation results in a white noise channel in the cases where n of the matched filter unit 300 is "1" and "8" are compared with each other using the above-described method, a low pass filter is omitted when n is "8" in which case the effect of the matched filter unit 300 can be obtained, rather than when n is "1" in which case the output of the matched filter unit 300 is the same as the transmission code, and thus the distortion of the transmission signal is reduced and SNR for the reception signal is increased, with the result that it can be seen that SNR capable of ensuring $10^{-6}$ BER performance has been improved by about 4 dB.

As described above, the present invention is advantageous in that its transmission rate is increased by 75% of the speed (corresponding to a maximum of three bits) in the case where four bits are transmitted as presented by the existing standard because an apparatus and method for transmitting data using a human body according to the present invention divide 16 orthogonal code vectors into groups of eight vectors, four vectors and four vectors, divide a maximum of 7 bits passed through an S2P into groups of three bits, two bits and two bits having different numbers of bits, combine three orthogonal codes, to which bits have been mapped, into a single code vector via a code combiner, and then transmit the single code vector as transmission symbols, rather than performing mapping and usage using a maximum of four bits passed through an S2P with respect to 16 orthogonal code vectors used as transmission symbols.

Furthermore, the present invention is advantageous in that a transmit mask required for a transmission signal by the standard because orthogonal code vectors having the same length and being the same in number as those of the standard are used even when transmission rate is increased.

Furthermore, the present invention uses the matched filter and, thus, is advantageous in that interference with other surrounding devices can be minimized because the harmonic and sidelobe components of a transmission signal can be attenuated, channel bandwidth can be reduced, the distortion of a transmission signal can be reduced because a low pass filter part can be excluded from a transmission filter intended to meet a transmit mask or the filter order of a low pass filter can be reduced, and detection performance can be improved because the SNR with respect to a reception signal is maximized by matched filtering at a receiver.

As described above, the optimum embodiments have been disclosed in the drawings and the specification. Although the specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true range of protection of the present invention should be defined based on the technical spirit of the attached claims.

What is claimed is:

1. A method of transmitting data using a human body, comprising:
   outputting a parallel bit stream for an input serial bit stream;
   dividing the parallel bit stream into a preset number of bit groups, and mapping the bit groups to code groups corresponding to respective orthogonal code vectors;
   combining orthogonal code vectors corresponding to outputs of the respective code groups into a single code vector, and outputting the single code vector;
   shifting a center frequency of a transmission signal by spreading the single code vector using a frequency shift code; and
   applying a transmission code, corresponding to a result obtained by shifting the center frequency of the transmission signal, to a human body through a matched filter and a transmission filter.

2. The method of claim 1, wherein the code groups correspond to results obtained by dividing 16 orthogonal codes into three groups.

3. The method of claim 1, wherein the matched filter comprises a raised cosine filter.

4. The method of claim 1, wherein a sample rate of the matched falter upon, applying the transmission code to the human body is n times a sampling speed of the frequency shift code.

5. The method of claim 4, wherein applying the transmission code to the human body comprises, when n is "1" in connection with the sample rate of the matched filter, applying the transmission code, corresponding to the result obtained by shifting the center frequency of the transmission signal, to the human body through only the transmission filter.

6. The method of claim 1, wherein applying the transmission code to the human body comprises applying the transmission code to the human body through only the transmission filter having a structure in which an analog low pass filter and a high pass filter, or an analog high pass filter and a low pass filter have been successively arranged.

7. An apparatus for transmitting data using a human body, comprising:
    a parallel bit stream generator which outputs a parallel bit stream for an input serial bit stream;
    a frequency selective spreader which divides the parallel bit stream into a preset number of bit groups, generates a single code vector by combining orthogonal code vectors corresponding to the respective bit groups, and shifts a center frequency of a transmission signal by spreading the single code vector using a frequency shift code;
    a matched filter which receives an output of the frequency selective spreader and performs matched filtering on the output; and
    a transmission filter which receives an output of the matched filter and meets a transmit mask for the transmission signal,
    wherein a transmission code, corresponding to a result obtained by shifting the center frequency of the transmission signal, is applied is applied to a human body through the matched filter and the transmission filter.

8. The apparatus of claim 7, wherein the frequency selective spreader maps the bit groups to respective code groups corresponding to the respective orthogonal code vectors, and combines three orthogonal code vectors corresponding to outputs of the respective code groups.

9. The apparatus of claim 8, wherein the code groups correspond to results obtained by dividing 16 orthogonal codes into three groups.

10. The apparatus of claim 7, wherein the matched filter comprises a raised cosine filter.

11. The apparatus of claim 7, wherein a sample rate of the matched filter is n times a sampling speed of the frequency shift code.

12. The apparatus of claim 11, wherein, when n is "1" in connection with the sample rate of the matched filter, the transmission code, corresponding to a result obtained by shifting the center frequency of the transmission signal, is applied to the human body through only the transmission filter.

13. The apparatus of claim 7, wherein the transmission code, corresponding to a result obtained by shifting the center frequency of the transmission signal, is applied to the human body through only the transmission filter having a structure in which an analog low pass filter and a high pass filter, or an analog high pass filter and a low pass filter have been successively arranged.

* * * * *